United States Patent
Frenne et al.

(10) Patent No.: US 9,088,978 B2
(45) Date of Patent: Jul. 21, 2015

(54) METHOD AND APPARATUS OF WIRELESS COMMUNICATIONS

(75) Inventors: Mattias Frenne, Uppsala (SE); Anahid Robert Safavi, Kista (SE); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 13/991,875

(22) PCT Filed: Oct. 29, 2010

(86) PCT No.: PCT/IB2010/003118
§ 371 (c)(1),
(2), (4) Date: Jun. 5, 2013

(87) PCT Pub. No.: WO2011/158060
PCT Pub. Date: Dec. 22, 2011

(65) Prior Publication Data
US 2014/0071909 A1   Mar. 13, 2014

(30) Foreign Application Priority Data
Jun. 15, 2010 (WO) ................. PCT/SE2010/000167

(51) Int. Cl.
| | | |
|---|---|---|
| H04W 80/04 | (2009.01) | |
| H04W 88/06 | (2009.01) | |
| H04W 28/04 | (2009.01) | |
| H04W 72/04 | (2009.01) | |
| H04L 5/00 | (2006.01) | |

(52) U.S. Cl.
CPC ......... *H04W 72/0406* (2013.01); *H04L 5/0091* (2013.01)

(58) Field of Classification Search
CPC ..... H04W 80/04; H04W 88/06; H04W 28/04; H04W 72/04
USPC ................................. 370/328, 329
See application file for complete search history.

(56) References Cited

U.S. PATENT DOCUMENTS

2010/0080187 A1   4/2010   Papasakellariou et al.

FOREIGN PATENT DOCUMENTS

| | | |
|---|---|---|
| CN | 101500242 A | 8/2009 |
| CN | 101547022 A | 9/2009 |
| CN | 101617489 A | 12/2009 |
| WO | 2009017363 A2 | 2/2009 |
| WO | 2009115563 A1 | 9/2009 |

OTHER PUBLICATIONS

International Search Report and Written Opinion of Patent Cooperation Treaty (PCT), International Application No. PCT/IB2010/003118, Applicant Huawei Technologies Co., Ltd., et al., date of mailing Apr. 21, 2011, 6 pages.
Extended European Search Report received in Application No. 10853159.1-1854, mailed Nov. 22, 2013, 9 pages.
(Continued)

*Primary Examiner* — Ronald B Abelson
(74) *Attorney, Agent, or Firm* — Slater & Matsil, L.L.P.

(57) ABSTRACT

Uplink sounding comprising sending one or more representations of a sounding request or a sounding request and configuration information indicator of uplink sounding in a wireless radio communication system is disclosed.

16 Claims, 3 Drawing Sheets

| IE 1 | IE 2 | IE 3 | IE 4 | IE 5 | X |
|---|---|---|---|---|---|

(56) References Cited

OTHER PUBLICATIONS

Huawei, "Increasing SRS Capacity to Support UL MIMO," 3GPP TSG RAN WG1 Meeting #59, R1-094707, Jeju, South Korea, Nov. 9-13, 2009, 4 pages.

Research in Motion, UK Limited, "Design and Configuration Considerations on Aperiodic SRS for LTE-A," 3GPP TSG RAN WG1 Meeting #60bis, R1-102054, Beijing, China, Apr. 12-16, 2010, 6 pages.

Huawei, "Sounding Extension using DMRS," 3GPP TSG RAN WG1 meeting #61, R1-103116, Montreal, Canada May 10-14, 2010, 6 pages.

METHOD AND APPARATUS OF WIRELESS COMMUNICATIONS

This patent application claims the benefit of International Application No. PCT/SE2010/000167 filed in Sweden on Jun. 15, 2010.

TECHNICAL FIELD

The invention relates to sounding in a wireless or radio communication system.

BACKGROUND

In a wireless communication system, different categories of reference signals are used. For instance, one category of reference signals is used to estimate the channel which is needed to enable coherent demodulation of a received signal containing both control and data information. Another category is used for channel quality measurements to enable scheduling, link adaptation, power control etc. This category is not associated with received data or control.

For example, in the 3rd Generation Partnership Project 3GPP Long Term Evolution LTE (Release-8) uplink, reference signals which are used for coherent demodulation are referred to as demodulation reference signals, DMRS, and reference signals which are used for channel quality measurements are referred to as sounding reference signals, SRS.

In LTE, uplink sounding reference signals, SRS, resources follow periodic transmission and the related transmission parameters are configured semi-statically by higher layer radio resource control, RRC, signalling. The configured transmission parameters include the periodicity of SRS, the transmission sub-frame, bandwidth, cyclic shift of SRS sequence, transmission comb in the frequency domain and so on. On SRS, UE uses every second sub-carrier for transmitting the reference signal as known in the art. Thereby a comb spectrum is obtained. Related sub-carrier offset defines a transmission comb for the distributed transmission. The transmission comb provides another means to multiplex UE reference signals in addition to cyclic shifts. SRSes corresponding to different User Equipment devices (UEs or user terminals) are multiplexed by a code division multiple access scheme, CDM, or frequency division multiple access scheme, FDM: Each SRS is a cyclic shifted version of a cell specific base sequence or different transmission comb in the frequency domain. Different cyclic shifts are allocated to different users to make detection possible at the base station/NodeB.

LTE-Advanced Rel-10 is an evolution of the LTE Rel-8 system in which uplink multiple antenna transmission is supported. Concerning Sounding Reference Signals, SRS, for Rel-10, it has been decided to use antenna-specific and non-precoded sounding resources to support multiple antenna closed loop precoding. This will increase Sounding Reference Signal, SRS, utilization and interference among different User Equipments compared to Rel-8. (Precoding is in this context a coding scheme to control usage of the multiple antennas.)

In order to settle these problems and to bring higher flexibility to sounding resource allocation, it has been proposed to use Demodulation Reference Signals, DMRS, also for sounding in which case a UE is scheduled but does not transmit any Physical Uplink Shared Channel, PUSCH, payload data. In this case, the DMRS shall be non-precoded, to allow for antenna specific channel measurements.

Each Demodulation Reference Signal, DMRS, is a cyclic shifted version of a Zadoff-Chu cell-specific based sequence. Totally eight possible cyclic shifts can be allocated for different DMRSs. However in Rel-8, one of the cyclic shifts is used and the remaining seven cyclic shifts are not utilized.

SUMMARY

Uplink sounding comprising sending one or more representations of a sounding request or a sounding request and configuration information indicator of uplink sounding in a wireless radio communication system is disclosed.

According to an aspect of the invention, instead of adding an IE or one or more additional IE bits to trigger and/or configure sounding, states in an already existing set of IEs which has at least one unused state trigger and/or configure sounding. By this solution, there will be no or very limited additional overhead in the UL grant. The information of those IEs that belong to the first group above but not the second group, such as for instance resource block assignment or indication of format, can still be used to schedule the sounding transmission.

Uplink grant with an extra bit cannot be used for UEs configured as single antenna port UEs, resulting in a need for multiple UL grant formats. A basis for the invention is an insight that there is an alternative way to signaling comprising adding one bit of additional overhead in each and every UL grant that is transmitted in the system. The present invention thus may save a considerable overhead. Embodiments of the present invention lessens the complexity of the system compared to prior art for the case of UEs configured as single antenna port UEs.

The invention also comprises a remote terminal and a radio base station corresponding to the method of the invention.

BRIEF DESCRIPTION OF THE DRAWINGS

Embodiments exemplifying the invention will now be described, by means of the appended drawings, on which FIG. 1 discloses introduction of a new information element, IE, in the Uplink grant to signal to the User Equipment to perform sounding, FIG. 2 discloses sounding triggered by using an already existing group of IEs having unused states, FIG. 3 discloses an overview of the method for sending a request for uplink sounding, and FIG. 4, discloses a remote terminal and a radio base station according to the invention.

DETAILED DESCRIPTION

A problem is how to trigger and/or configure a UE for transmitting sounding using Demodulation Reference Signals, DMRS, without concurrent transmission of data (i.e. uplink payload data on the Physical Uplink Shared Channel, PUSCH).

Figure 1:
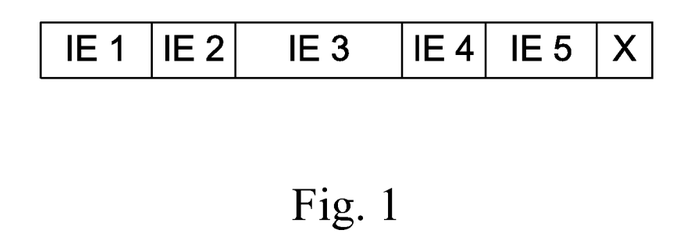

A straightforward solution for dynamically triggering and/or configuring sounding, e.g. using Demodulation Reference Signals, DMRSes, without a concurrent Physical Uplink Shared Channel, PUSCH, transmission consists of adding one or more new bits to the Uplink, UL, grant to signal to the UE that it must perform sounding. In FIG. 1, a representation of an Uplink grant is shown, where IE denotes an information element in the UL grant which can be a defined number of bits indicating resource block allocation, precoding and rank information, MCS (Modulation and Coding Selection), etc.

In order to trigger sounding, it can be envisaged to add for example one bit "X" in UL grant, see FIG. 1. If X=1, UE shall perform sounding, e.g. via DMRS, and thus PUSCH data (i.e. payload data) is not transmitted. If X=0, UE shall interpret the UL grant as a "normal" UL grant, and PUSCH is transmitted.

Observing that in Rel-8, seven out of eight possible cyclic shifts are not allocated for DMRSes, some unutilized DMRS cyclic shifts can be reused for sounding. Unutilized DMRS cyclic shifts may thus be used for sounding in empty (non Physical Uplink Shared Channel, PUSCH, scheduled) resource blocks or in the resource blocks where there are PUSCH scheduled for other User Equipments.

In contrast to, e.g., uplink Multi User-Multiple Input Multiple Output (MU-MIMO), at least one of the co-scheduled User Equipments is not transmitting uplink payload data on the Physical Uplink Shared Channel, PUSCH, (but all co-scheduled UEs transmit Demodulation Reference Signals, DMRS).

Below, the UE and remote station are used interchangeably when describing the invention. A remote station is the more general term and encompasses user equipment and also other devices, such as relay node (explained below). The invention is not restricted to user equipment devices and thus sometimes when such a device is mentioned, it applies to a remote station of any sort (such as a relay node).

The Physical Downlink Control Channel, PDCCH, is used for downlink control information, mainly scheduling-decisions required for reception of the PDSCH and scheduling-grants enabling the transmission of physical uplink shared channel (PUSCH) payload data. Scheduling-grants enabling transmission of PUSCH data are basically UL grants. A UL grant consists of a number of information elements called IEs. At least part of the following information is preferably carried on the IEs of an uplink grant corresponding to a PUSCH transmission:

Resource block, RB, assignment: RB assignment is used to indicate the position of the resource block allocated to a UE. This indicates where the UE can transmit PUSCH payload data.

Modulation and coding scheme, MCS, and redundancy version, RV: Based on these information fields, resource block assignment and the transport block size, the coding rate and the RV after rate matching can be derived. In Rel-8, MCS and RV are jointly encoded. In case of uplink spatial multiplexing, the MCS and RV for two transport blocks in support of up to two codewords are needed.

New data indicator, NDI, which is a Hybrid automatic repeat request, HARQ, parameter. NDI is used to indicate whether the transport block to be transmitted is a new one or a retransmission. When NDI is toggled, or NDI=1, it means that one new transport block should be transmitted; otherwise, the transmitted transport block is same as the previous transport block, i.e. a retransmission.

Precoder matrix index (PMI) and rank index (RI) which is introduced in the case of uplink spatial multiplexing. In case of multiple antenna transmission, PMI and RI is needed to support codebook based close loop precoding.

Demodulation Reference signals (DMRS) assignments which indicate cyclic shift (CS) of base sequence and orthogonal cover codes (OCC) as the primary and secondary multiplexing scheme.

Transmit Power Control (TPC) command for scheduled Physical Uplink Shared Channel (PUSCH) payload data which represents how to adjust the transmission power for PUSCH and DMRS.

In addition to the above listed Information Elements (IEs), other information such as aperiodic CQI (Channel Quality Indicator) request or Carrier Indicator Field (CIF), a comb indicator, a frequency hopping indicator, frequency hopping bandwidth, transmission bandwidth, frequency domain start position, or number of antenna ports is included depending on the application scenario.

Scheduling characteristics for dynamic aperiodic sounding, e.g. via Demodulation Reference Signals (DMRS), according to the invention is quite similar to the dynamic Physical Uplink Shared Channel (PUSCH) payload data scheduling described above.

Signalling format based on Uplink (UL) grant for dynamic PUSCH scheduling can be reused to trigger and/or configure dynamic aperiodic sounding. According to various embodiments of the invention, triggering and/or configuring of sounding is performed by using information states of one or more IEs within UL grant which are available and not used for data (PUSCH) transmission, or in other words are invalid for PUSCH.

Meanwhile, additional information for sounding such as Physical Resource Block (PRB) allocation, cyclic shift, power control command or frequency hopping can be taken from the information elements of the physical downlink control channel (PDCCH) that are dedicated to such general information for data transmission.

Figure 2:
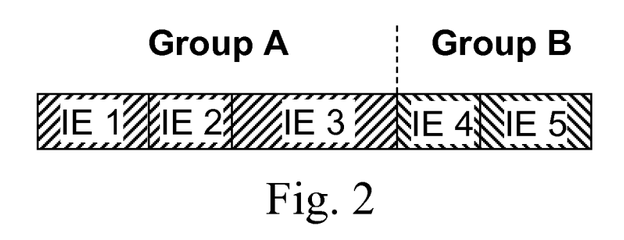

More precisely, different IEs in the Uplink (UL) grant can be divided into two different groups, shown also in FIG. 2. First group or group A corresponds to the IEs used both in the case of sounding and data transmission. Second group or group B corresponds to the IEs that are unused in the case of sounding. Therefore one can use them to trigger and/or configure sounding and still use the information provided by the IE in group A.

In the following, we will give in detail the list of IEs corresponding to each group.

As mentioned before, group A of IEs is used both in the case of sounding and data transmission. This could be the case for:

Flag for indicating the format,
Resource Block (RB) assignment,
Transmit Power control (TPC),
Demodulation Reference Signals (DMRS) assignment, and
Carrier Indicator Field (CIF).

Group B comprises one or more IEs, or state variables, which are unused in the case of sounding. This could be the case for one or any combination of the following elements:

Modulation and Coding Selection (MCS),
Precoder Matrix Index (PMI)/Rank Index (RI) (PMI/RI),
New Data Indicator (NDI),
Aperiodic Channel Quality Indicator (CQI) request, and
Indication of contiguous or non-contiguous transmission.

Since these IEs of group B do not contain any information used in the case of sounding transmission, these IEs can be encoded to (implicitly) distinguish the transmission of data or sounding, and may also be used to implicitly indicate that some sounding parameters are conveyed in the PDCCH by reinterpreting some elements. Encoding of IEs for (implicit) sounding request and/or configuration information can be done by using at least one of states or combinations of states of these IEs which are not valid/defined for data transmission. When User Equipment (UE) receives the Uplink (UL) grant on the Physical Downlink Control Channel (PDCCH), it will detect the states of one or more of the group B information elements to know whether data must be sent or sounding is triggered by such PDCCH. If an invalid state (or states) is detected, it preferably implies that the PDCCH is not for data scheduling and indirectly means that this is to trigger aperiodic SRS and some transmission parameters for the triggered aperiodic SRS transmitted in some information elements of the PDCCH. Consequently, an invalid state has three functions, indicating no data scheduling indicator,
triggering SRS, and
providing a configuration information indicator.

Of course, an invalid state need not have or take on all these functions.

A sounding procedure preferably comprises both sounding using additional resources (such as Demodulation Reference Signal, DMRS) and sounding using existing resources. It is worth mentioning that an explicit triggering request may also be included in the PDCCH by transmission of an (explicit) information element in addition or as an alternative to an implicit representation.

With the above in mind, a possible implementation of a method according to the invention can be described in more detail as follows. The method for sending a request for uplink sounding in a wireless radio communication system comprises:

Sending, from a base station to a remote terminal, representation of the sounding request and configuration information indicator using a physical layer downlink control channel signal comprising a (first) group of information elements each carrying information, corresponding to different states, relevant for scheduling a physical layer uplink shared channel. The uplink shared channel is intended for payload data transmission and comprises payload data transmission space and demodulation reference signals space.

These two spaces of the uplink shared channel can be thought of as spaces in a frequency-time grid. I.e. the transmission is taking place over different frequencies and at different points in time. The scheduling of this resource therefore concerns: where in the frequency-time grid a user shall be granted to transmit, and further to define the characteristics of such a transmission, such as modulation of data, coding of data, what resource block to use, demodulation reference signals allocation, etc.

Further in the method, the remote terminal will receive a representation of an uplink sounding request and optionally a configuration information indicator. Upon transmission over the physical downlink control channel, decoding and recognising a request for sounding, it will send to the base station sounding reference signals e.g. on the uplink shared channel in the demodulation reference signal space. This does not exclude sending of sounding reference signals in the sounding reference signal space or, as e.g. conveyed in a PDCCH, according to at least one transmission parameter derived from at least one configuration information indicator. According to an embodied method a sounding request representation and optionally at least one configuration information indicator or representation thereof are sent/received using at least one state of at least one information element from a second group, being a subset of the first group of information elements. This second group of information elements comprise information elements which are reserved for scheduling-information concerning contents of an exclusive payload data transmission space. Such content is really the payload data itself, and the scheduling-information concerning such data has been mentioned above in relation to the description of FIG. 2 where it was identified as belonging to "group B" information elements. It is scheduling-information that basically describes how the data itself is supposed to be treated, such as coding, modulation etc.

Figure 3:
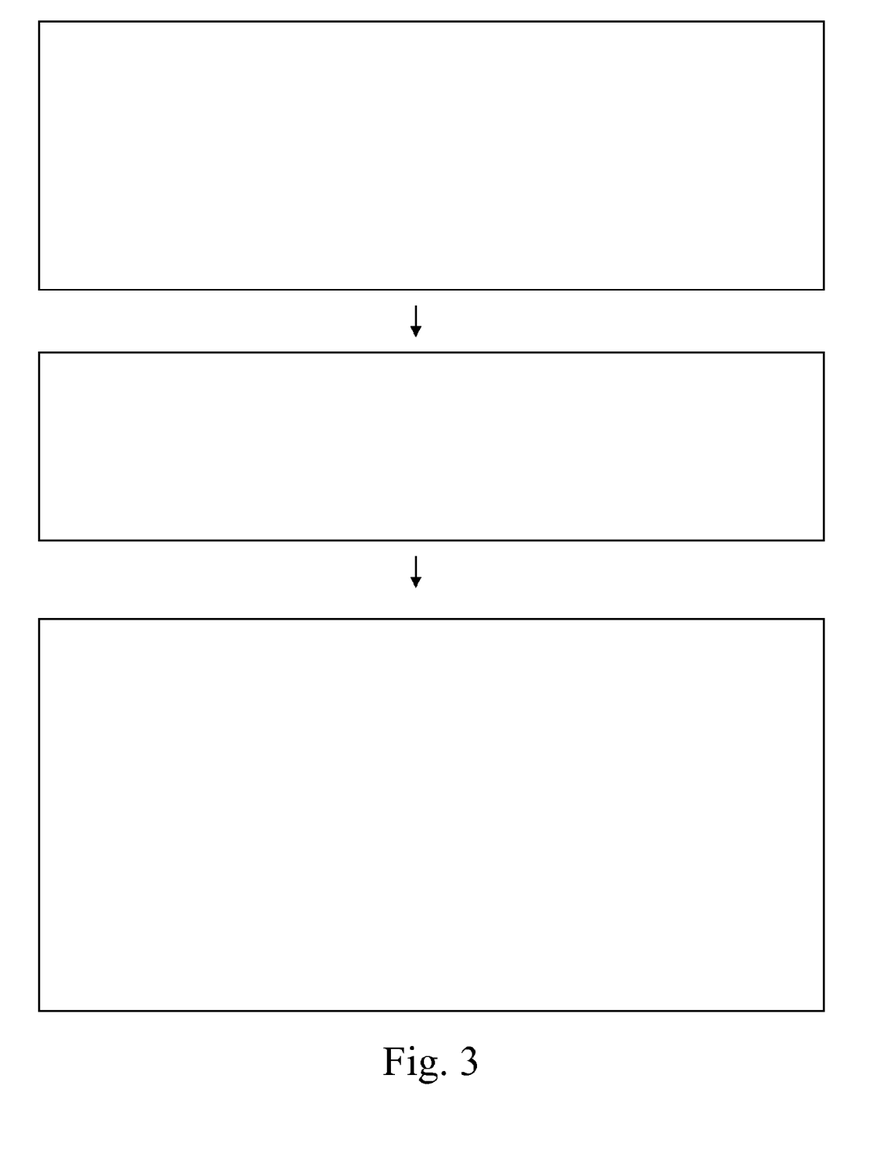

Now, the at least one state that is used to signal and/or configure sounding is peculiar in that it is undefined for such scheduling-information concerning contents of an exclusive or "data-only" payload data transmission space. We thus identify at least one step that is undefined for the case of data transmission and define it to represent a request and/or configuration information indicator for sounding. The steps of the method are schematically disclosed in FIG. 3.

In relation to this method according to the invention, it can be mentioned that at least one information element, which is a member of said first group but not of said second group of information elements, is reserved to provide scheduling-information which is common for uplink sounding and for payload data transmission on the uplink shared channel.

Further, such common scheduling information can be uplink shared channel resource allocation and/or demodulation reference signal allocation for the remote terminal.

In the general case, the sending of sounding reference signals on the uplink shared channel is accompanied with sending a zero-payload in the payload data transmission space. That is, usually when sending the sounding reference signals nothing is sent in the payload data transmission space, which is therefore left empty. However, it may be possible to send some sort of data here concurrently with the sounding signals, but it is not a requisite for the method of the invention.

Introducing (dynamic) aperiodic SRS on top of defined periodic SRS, the SRS may be triggered on an as needed basis with further triggering and configuration being dynamic. Thereby, e.g., SRS resources are managed with great flexibility.

To further elucidate this invention, several embodiments are provided here below for the purpose of illustration.

First Set of Embodiments

In a first set of embodiments of the method according to the invention, the at least one state used for representing a sounding request is at least one state of a single information element, so that sounding requesting is represented by state(s) of the single information element.

Embodiment 1

Invalid State of CIF

In one embodiment, the method according to the invention employs at least one state of the Carrier Indicator Field (CIF) information element as the at least one state used for requesting sounding. When carrier aggregation is supported, three bits CIF will be configured in an Uplink (UL) grant to signal in which component carrier Physical Uplink Shared Channel (PUSCH) payload data is to be transmitted. It has been decided to aggregate up to five component carriers. There are at least three states of CIF which are not used. In accordance with embodiment 1, one of the unused states of CIF is used to trigger sounding.

Embodiment 2

Invalid State of PMI/RI

In a further embodiment of the method according to the invention, the at least one state used for requesting sounding is at least one state of the Precoder Matrix Index (PMI)-Rank Index (RI) information element. In LTE-A, codebook based close loop precoding is supported and the PMI/RI information is included in the Uplink (UL) grant of the Physical Downlink Control Channel (PDCCH). For two transmit antennas, there are 6 precoding vectors for rank 1 and one precoding matrix for rank 2. Due to joint encoding of PMI and RI, there will be three bits to indicate the rank and the corresponding precoding matrix/vector. As three bits can represent eight states and there are only seven precoding matrix/vectors for signalling, one state will not be used, or is invalid/undefined for data transmission. Hence, this state can be used to trigger a Sounding Reference Signals (SRS) transmission. For example, three bits [1 1 1] is not used for PMI/RI signalling, and can thus be used for triggering sounding. When the User Equipment (UE) checks that the PMI/IE element in the UL grant PDCCH is [1 1 1], it knows that a sounding transmission is needed rather than a transmission of Physical Uplink Shared Channel (PUSCH) payload data. Here the particular state [1 1 1] is just an example for the purpose of illustration, and could have been illustrated as well by another state, e.g., [1 1 0]. The particular state allocated depends on which particular state is not used for the PMI/RI. For four transmit antennas, there are 24/16/12/1 precoding matrix/vectors for rank 1/2/3/4 respectively and six bits for signalling PMI/RI. There are 11 states which are not used for signalling PMI/RI. Similarly, anyone of the unused states is preferably used to trigger sounding.

Second Set of Embodiments

In a second set of embodiments of the method according to the invention, the at least one state used for a sounding request representation and/or configuration information indicator could be formed by at least two states from a combination of at least two information elements. Thus, a combination of states from two or more information elements can together yield an invalid or unused combination of these states that could be used to signal a request for sounding or provide an associated configuration information indicator, due to a greater number of states being available as compared to the first set of embodiments.

Embodiment 3

Combination of MCS and NDI

In one embodiment of the method according to the invention, the at least two states used for requesting sounding are states from a combination of Modulation and Coding Selection (MCS) and New Data Indicator (NDI) information elements. In the Uplink (UL) grant over the Physical Downlink Control channel (PDCCH), MCS has 5 bits to represent 32 states, in which the last 3 states (MCS=29/30/31) are used for retransmission without the indication of transport block size and modulation scheme. When the User Equipment (UE) receives one of the last three states, the UE knows that the retransmission of a previous transport block is needed and refers to the latest PDCCH transmission to obtain the transport block size and modulation scheme. NDI indicates if the transport block to be transmitted should be a new or retransmitted one. Hence in a normal UL grant, when one of the last states of MCS is transmitted in PDCCH, NDI is 0 or not toggled (as compared to earlier transmission) to indicate the retransmission. Hence the combination of MCS=29/30/31 and NDI being toggled or 1 is invalid for normal data transmission. As a consequence, the combination of MCS=29/30/31 and NDI being toggled or 1 can be allocated to trigger the sounding transmission.

As there is only one transport block in case of single antenna transmission, there is one MCS and NDI in an UL grant. In this case, MCS=29/30/31 and NDI being toggled or 1 is preferably used to trigger sounding. For spatial multiplexing, there are two codewords and then one MCS and NDI per codeword is needed. Correspondingly, MCS_1=29/30/31 and NDI_1 being toggled or 1 & MCS 2=29/30/31 and NDI_2 being toggled or 1 would be needed to trigger sounding. In other words, the combination of MCS=29/30/31 and NDI being toggled, or 1, is used to disable one transport block or codeword.

Embodiment 4

Combination of RI and MCS

In a further embodiment of the method according to the invention, the at least two states used for requesting sounding are states from a combination of Rank Index (RI) and Modulation and Coding Selection (MCS) information elements. To support up to two codewords or transport blocks, there will be one MCS (5 bits) and NDI (1 bit) per codeword. For two transmit antennas, one bit RI indicates rank-1 or rank-2. When rank is 1 (e.g. RI=0), there is only one transport block available, and MCS_1 and NDI_1 is for the enabled transport block. NDI_2 indicates which transport block is enabled, and MCS_2 (5 bits) indicates the six precoding vectors of rank 1 PMI and the remaining 26 states are reserved. When rank is 2, MCS_1/NDI_1 is for the first transport block and MCS_2/NDI_2 is for the second transport block. The combination of RI=0 and one of 26 MCS_2 reserved states can trigger sounding.

Embodiment 5

Combination of PMI/RI and MCS

In still a further embodiment of the method according to the invention, the at least two states used for requesting sounding are states from a combination of Precoder Matrix Index (PMI)-Rank Index (RI) and Modulation and Coding Selection (MCS) information elements. In case of four transmit antennas, there are 5 bits PMI/RI and two MCS and NDI for two transport blocks. There are the following interpretation on PMI/RI, MCS and NDI (New Data Indicator).
PMI/RI=0 (rank-1, one transport block enabled)
    MCS_1 and NDI_1 is for the enabled transport block
    NDI_2 indicates which transport block is enabled
    MCS_2 indicates 24 precoding vectors of rank-1 and 8 states are reserved PMI/RI=1 . . . 29 (rank 2-4, both transport blocks enabled)
    MCS_1, NDI_1 is for the first transport block and MCS_2, NDI_2 is for the second transport block
    PMI/RI=30/31 are reserved.
For this case, the PMI/RI=30 or 31 can be used to trigger sounding, or the combination of PMI/RI=0 and one of MCS_2 reserved states is to trigger sounding.

Benefits: Sounding can be triggered without any additional overhead. The same DCI (Downlink Control Information) format can thus be used for Physical Uplink Shared Channel (PUSCH) payload data and sounding Uplink (UL) grant.

Embodiment 6

Combination of MCS, NDI and CQI Request

As mentioned above, the combination of MCS being 29, 30 or 31 and NDI being toggled (or 1) is an invalid combination for normal data transmission. In accordance with embodiment 6, a state of MCS being 29, 30 or 31 and NDI being toggled (or 1) indicates (implicitly) that sounding is triggered. When there is such a combination of MCS and NDI, there is no data. It implies that aperiodic CQI request is not possible/available. Thereby CQI request may be included to have a total number of 6 states for indication of sounding parameters such as the number of SRS antenna ports and comb. Meanwhile, resource block assignment is preferably used to indicate sounding bandwidth and position in frequency domain. Cyclic shift indicator is preferably applied to indicate a basic shift to derive cyclic shifts of various antennas according to a particular rule.

Embodiment 7

Combination of MCS, NDI, CQI Request and FH

In accordance with embodiment 7, a combination of MCS being 29, 30 or 31, and NDI being toggled (or 1) provides an invalid state for normal data transmission as for embodiment 6. Instead one or more particular states as formed by combinations of MCS, NDI, aperiodic CQI and FH (Frequency Hopping) are specified to indicate whether there is frequency hopping for the triggered sounding. Combination of these specified parameters provides a maximum of 3·3·2=12 states, invalid for normal data transmission and, in accordance with the embodiment, are available to indicate, e.g., frequency hopping bandwidth. In order to indicate frequency hopping bandwidth in conjunction with comb, a total of 4·2+2=10 states are needed. As identified, by combining of specified states of MCS, NDI, CQI request and FH an adequate number of states is provided to configure sounding hopping parameters.

Other Considerations

The remote terminal of the method according to the invention may be a User Equipment, for instance a mobile phone, but it is also conceivable that it is any type of equipment that is communicating with a base station in accordance with the method of the invention. One example could for instance be a Relay Node, i.e. a coverage extender that communicates with a base station and then replicates the signals of that base station with a better signal to noise ratio to improve coverage in poorly covered areas of the radio base station.

It should be noted that all different steps of the method of the invention described may be combined, where they are not contradictory. For instance, the step to use Carrier Indicator Field (CIF) could be combined with the step of the method when the remote terminal is a relay node. There is nothing contradictory in this, and therefore it is possible and hence also an embodiment of the invention. However, the step to use for instance at least two states from a combination of at least two information elements combined with the step to use at least one state of the CIF information element, would be an example of a contradictory combination, since using the CIF means using only one information element, not two.

Remote Terminal

Figure 4:
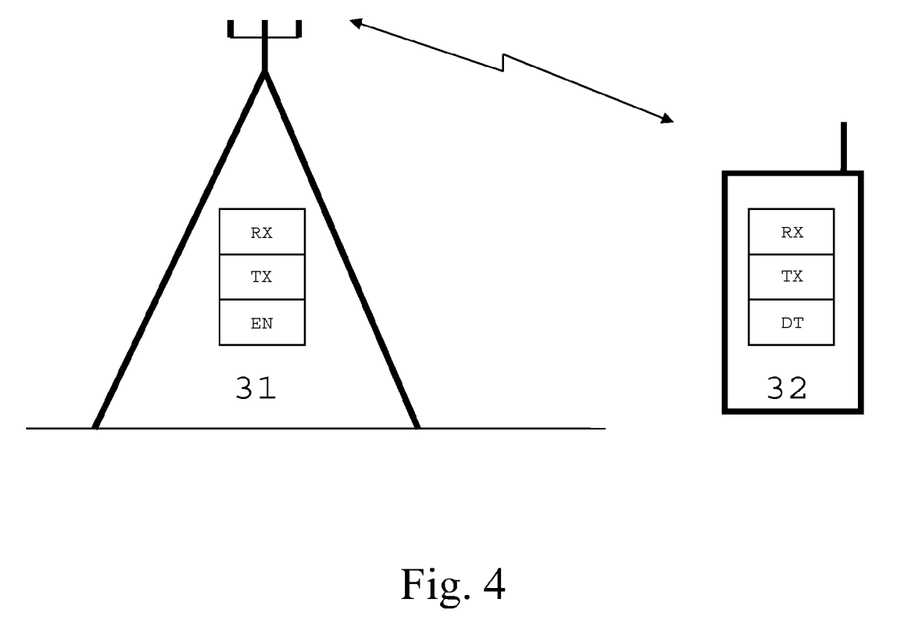

FIG. 4 schematically illustrates a radio communication system comprising at least one remote terminal 320 according to the invention, which will be described in more detail below.

The embodied invention thus comprises a remote terminal for a wireless or radio communication system. The remote terminal is adapted to receive, RX, from a base station, a representation of uplink sounding request and/or configuration information indicator in the wireless radio communication system, the representation of the sounding request and/or configuration information indicator being sent using a physical layer downlink control channel signal comprising a (first) group of information elements each carrying information, corresponding to different states, relevant for scheduling a physical layer uplink shared channel, said uplink shared channel intended for payload data transmission and comprising payload data transmission space and demodulation reference signals space. Further, the remote terminal is adapted to detect, DT, the request represented by at least one state of at least one information element from a second group, being a subset of the first group of information elements, said second group comprising information elements which are reserved for scheduling-information concerning contents of an exclusive payload data transmission space and wherein said at least one state is undefined for such scheduling-information concerning contents of the exclusive payload data transmission space. Finally in accordance with the embodiment as illustrated, the remote terminal is adapted to send, TX, after receiving the request, to the base station, sounding reference signals, e.g. on the uplink shared channel in the demodulation reference signals space, in the sounding reference space or according to transmission parameters as derived from a configuration information indicator or representation thereof.

Principally, the remote terminal can be arranged to perform any step of the method according to the invention, described above, as desired for a particular application and from a remote terminal point of view. The notion that the remote terminal is adapted to receive and send in accordance with the method, described above, corresponds to the remote terminal part of the more general method of the invention described before. It implies that the remote terminal is provided with the necessary structures to put the method to use. Such structures could involve an electronic memory, a microprocessor, a circuit for sending electric signals, etc.

Radio Base Station

FIG. 4 schematically illustrates a radio communication system comprising at least one radio base station 310, which will be described in more detail below.

The invention thus also comprises a radio base station for a wireless radio communication system. The base station is adapted to send, TX, to a remote terminal, an uplink sounding request and/or configuration information indicator or a representation thereof in the wireless radio communication system, the request using a physical layer downlink control channel signal comprising a (first) group of information elements each carrying information, corresponding to different states, relevant for scheduling a physical layer uplink shared channel, said uplink shared channel intended for payload data transmission and comprising payload data transmission space and demodulation reference signals space. The base station is further adapted to encode, EN, the request and/or configuration information indicator to be represented by at least one state of at least one information element from a second group, being a subset of the first group of information elements, said second group comprising information elements which are reserved for scheduling-information concerning contents of an exclusive payload data transmission space and wherein said at least one state is undefined for such scheduling-information concerning contents of said exclusive payload data transmission space. Finally in accordance with the embodiment as illustrated, the base station is further adapted to be capable of receiving, RX, from the remote terminal and after the remote terminal has received a request and/or configuration information indicator or a representation thereof, sounding reference signals e.g. on the uplink shared channel in the demodulation reference signals space, in the sounding reference space or according to transmission parameters as derived from a configuration information indicator or representation thereof.

Principally, the radio base station can be arranged to perform any step of the method according to the invention, described above, as desired for a particular application and from the base station point of view. The notion that the base station is adapted to send and receive, corresponds to the base station part of the more general method of the invention described before. It implies that the base station is provided with the necessary structures to put the method to use. Such structures could involve an electronic memory, a microprocessor, a circuit for radiating radio frequency signals, etc.

The invention claimed is:

1. A method of sending a request for uplink sounding in a wireless communication system comprising:
   communicating, from a base station to a remote terminal, the request on a physical layer downlink control channel signal comprising a first group of information elements each carrying information, corresponding to different states, relevant for scheduling a physical layer uplink shared channel, the uplink shared channel intended for payload data transmission and comprising payload data transmission space and demodulation reference signals space; and
   communicating from the remote terminal, after the request is received, to the base station, using sounding reference signals on the uplink shared channel in the demodulation reference signals space,
   wherein the sending the request is represented by at least one state of at least one information element from a second group of information elements that is a subset of the first group of information elements, said second group of information elements comprising information elements which are reserved for scheduling-information concerning contents of an exclusive payload data transmission space, wherein said at least one state is undefined for scheduling-information concerning contents of said exclusive payload data transmission space.

2. The method according to claim 1, wherein at least one information element, which is a member of said first group but not of said second group of information elements, is reserved to provide common scheduling-information which is common for uplink sounding and for payload data transmission on the uplink shared channel.

3. The method according to claim 2, wherein said common scheduling information is uplink shared channel resource allocation and/or demodulation reference signal allocation for the remote terminal.

4. The method according to claim 1, comprising communicating the sounding reference signals on the uplink shared channel with a zero-payload in the payload data transmission space.

5. The method according to claim 1, wherein the at least one state is at least one state of a single information element.

6. The method according to claim 5, wherein the at least one state is at least one state of Carrier Indicator Field, CIF, information element.

7. The method according to claim 5, wherein the at least one state is at least one state of Precoder Matrix Index-Rank Index, PMI/RI, information element.

8. The method according to claim 1, wherein the at least one state is at least two states from a combination of at least two information elements.

9. The method according to claim 8, wherein the at least two states are states from a combination of Modulation and Coding Selection, MCS, and New Data Indicator, NDI, information elements.

10. The method according to claim 8, wherein the at least two states are states from a combination of Rank Index, RI, and Modulation and Coding Selection, MCS, information elements.

11. The method according to claim 8, wherein the at least two states are states from a combination of Precoder Matrix Index-Rank Index, PMI/RI, and Modulation and Coding Selection, MCS, information elements.

12. The method according to claim 1, wherein the remote terminal is a User Equipment or a Relay Node.

13. A remote terminal of a wireless communication system, the remote terminal comprising
   receiving processing circuitry to receive a request for uplink sounding, the request being sent on a physical layer downlink control channel signal comprising a first group of information elements each carrying information, corresponding to different states, relevant for scheduling a physical layer uplink shared channel, the uplink shared channel intended for payload data transmission and comprising payload data transmission space and demodulation reference signals space, and
   detection processing circuitry to detect a request represented by at least one state of at least one information element from a second group of information elements that is a subset of the first group of information elements, said second group of information elements comprising information elements which are reserved for scheduling-information concerning contents of an exclusive payload data transmission space, wherein said at least one state is at least one state that is undefined for scheduling-information concerning contents of said exclusive payload data transmission space.

14. The remote terminal according to claim 13 comprising sending processing circuitry to send, in response to the request, sounding reference signals on the uplink shared channel in the demodulation reference signals space.

15. A radio base station of a wireless communication system, the base station comprising
   sending processing circuitry to send a request for uplink sounding on a physical layer downlink control channel signal, the signal comprising a first group of information elements each carrying information, corresponding to different states, relevant for scheduling a physical layer uplink shared channel, the uplink shared channel intended for payload data transmission and comprising payload data transmission space and demodulation reference signals space, and
   encoding processing circuitry to encode the request to be represented by at least one state of at least one information element from a second group of information elements that is a subset of the first group of information elements, said second group of information elements comprising information elements which are reserved for scheduling-information concerning contents of an exclusive payload data transmission space, wherein said at least one state is at least one state classified as undefined for scheduling-information concerning contents of said exclusive payload data transmission space.

16. The radio base station according to claim 15 further comprising
   receiving processing circuitry to receive, in response to the request, sounding reference signals on the uplink shared channel in the demodulation reference signals space.

* * * * *